Oct. 27, 1970 — L. HYMES — 3,535,766

MACHINE ASSEMBLY METHOD

Filed Dec. 12, 1967 — 3 Sheets-Sheet 1

INVENTOR
LAWRENCE HYMES
BY E. Ronald Coffman
ATTORNEY

Oct. 27, 1970 L. HYMES 3,535,766
MACHINE ASSEMBLY METHOD
Filed Dec. 12, 1967 3 Sheets-Sheet 2

United States Patent Office 3,535,766
Patented Oct. 27, 1970

3,535,766
MACHINE ASSEMBLY METHOD
Lawrence Hymes, Lexington, Ky., assignor to International Business Machines Corporation, Armonk, N.Y., a corporation of New York
Filed Dec. 12, 1967, Ser. No. 689,823
Int. Cl. B23p *17/00*
U.S. Cl. 29—421                     10 Claims

ABSTRACT OF THE DISCLOSURE

Components of small machines and appliances are entrapped about their base ends by so-called superplastic sheet metal deformed by pneumatic pressure. By this method the components are simultaneously attached to and assembled with a metal support base or chassis capable of accurately maintaining them in precise geometrical location and alignment.

Small machines, and particularly those having one or more rotating shafts, typically include a number of primary structural components which are assembled onto a common chassis or base plate. Proper alignment of these primary components is ordinarily achieved by use of precision machine tools, by design of adjustable part construction, or by the use of self-aligning secondary components. In practice, machine design production methods and capital expense are each greatly influenced by the state of the art inability to cheaply maintain and insure critical alignment of the primary support components of small machines.

My invention relies upon the solid structure of a stationary jig or fixture to define the accurate positioning and alignment of the primary structural components of a machine. In my invention, such components, positioned accurately in a jig, are entrapped by pneumatically formed sheet metal operating substantially simultaneously on all components and at low force levels whereby the accuracy initially defined by the jig is not upset during the assembly and attachment process. Furthermore, the base or chassis formed of superplastic metal is characterized by insignificant shrinkage and substantial rigidity after forming to maintain the alignment and positioning of the components upon removal from the jig.

My invention is inherently tolerant to off-dimension components as it simply attaches to the components in their correct position regardless of their dimension. Their correct position can thus be identified by critical points such as the openings for bearings which are required to be concentric. Indeed, structures now made of single parts which are precision machined to assure accurate interpart dimensioning and parallelism can be provided by a plurality of individual parts each having a relatively roughly dimensioned outside geometry and by relying on the accuracy of the stationary jig to define the accurate interpart dimensions required.

My invention also provides a number of secondary features which enhance the overall utility and versatility of machines built by my process. My process is capable of assembling thermoset plastic parts as well as metallic castings and stampings. After forming, the base of the machine is treatable substantially as any other metal and can be drilled, threaded, soldered, punched, sheared, plated or painted as desired using state of the art techniques. In addition, the fact that the base of the machine is metal also makes it insensitive to changes in ambient humidity which tend to distort many structural resins.

My assembly process can also accommodate a considerable degree of forming of the base itself as may be desired to provide structural reinforcement, inclusion of decorative or informative surface markings, for example, trade marks or serial numbers, and even can provide a three-dimensional base by the formation of integral platforms for later mounting of subcomponents. All surface forming and configuring is accomplished simply by employing the teachings of U.S. Pat. 3,340,101, entitled "Thermoforming of Metals," issued Sept. 5, 1967, to Davis S. Field, Jr., Daniel L. Mehl, and Bernard F. Addis.

Essentially, my process involves the steps of supporting components in their desired mutual geometrical relationship and forming a sheet of so-called superplastic metal around the base ends of the components to interconnect the components in their mutual position. Practice of my process takes advantage of known practice in the art of jig and fixture making for assuring accurate alignment of components prior to and during forming.

Sheet metal appropriate for use in my process is selected in accordance with the procedure described in aforesaid U.S. Pat. No. 3,340,101. Some appropriate metals are, by weight:

78% zinc, 22% aluminum
67% aluminum, 33% copper
88.3% aluminum, 11.7% silicon
62% copper, 38% zinc
59% copper, 41% zinc
52% copper, 48% zinc However, it is to be understood that any material exhibiting a significant strain rate sensitivity may be considered for use as a machine base in my process.

The aforesaid U.S. Pat. 3,340,101 also describes appropriate conditioning treatments for causing the superplastic metals to exhibit their strain rate sensitivity. Usually such pretreatments involve, as a final step thereof, the heating of the metal to a critical superambient forming temperature. This final heating step can be performed either prior to or during the early stages of my assembly process.

Actual deformation of the sheet metal is accompilshed by application of a pneumatic load either by vacuum or superatmospheric pressure. The pneumatic loading is ideally accommodating to the variation of tolerance in the parts to be assembled, in comparison, say, with any mechanical pressure tool that might be provided.

After the assembly is formed, the base must be made rigid prior to removal from the jig. The base can be made rigid by cooling to room temperature by exposure to the air or by actual application of a vaporant coolant. Where the base is made of the zinc-aluminum eutectoid (78% zinc, 22% aluminum by weight) discussed in aforesaid U.S. Pat. 3,340,101, and the components are relatively insensitive to temperatures in the range of 600 degrees F., I prefer to overheat the base, taking it out of its range of superplastic behavior and into a range where it is relatively rigid. The overheated base and parts assembled thereto thus can be ejected from the jig and cooled separately.

Final assembly of the machine can employ conventional metal working techniques, if desired, such as drilling, threading, punching, shearing, polishing, plating, soldering and welding.

These and other objects, features and advantages of my invention will be apparent to those skilled in the art from the following specific description of a preferred embodiment of my invention wherein reference is made to the accompanying drawings of which:

Figure 1:
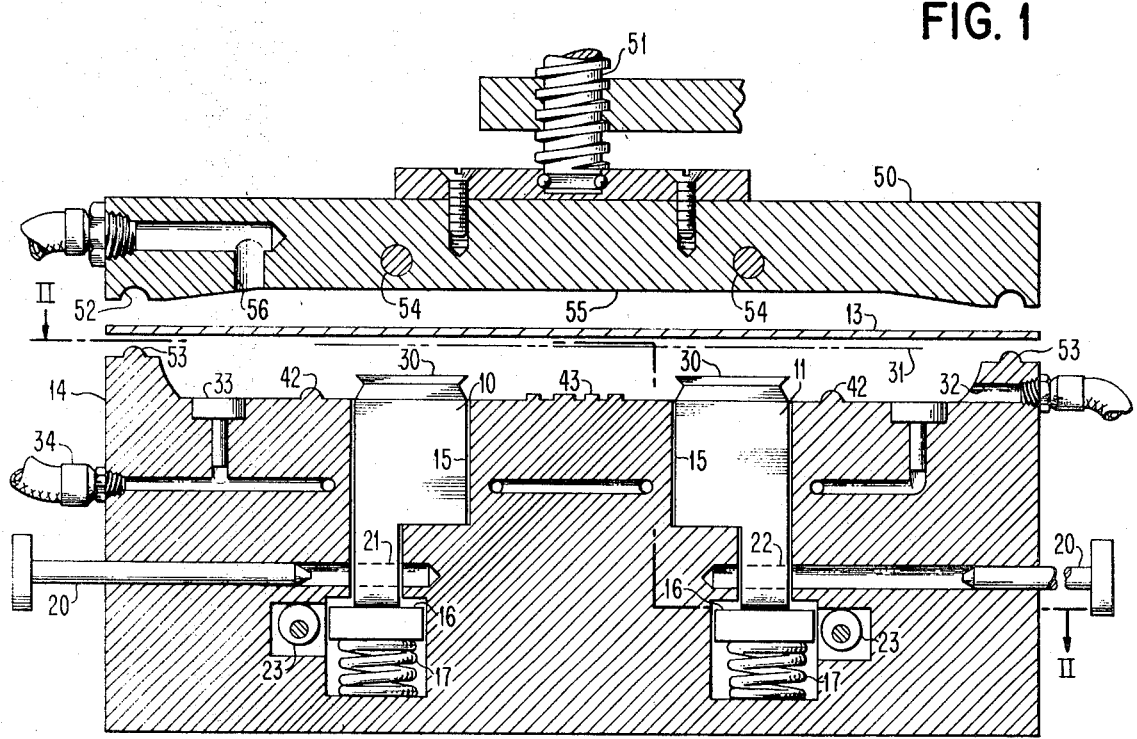
FIG. 1 is a front elevational view in cross-section of typical equipment for performing the process of my invention.
Figure 2:
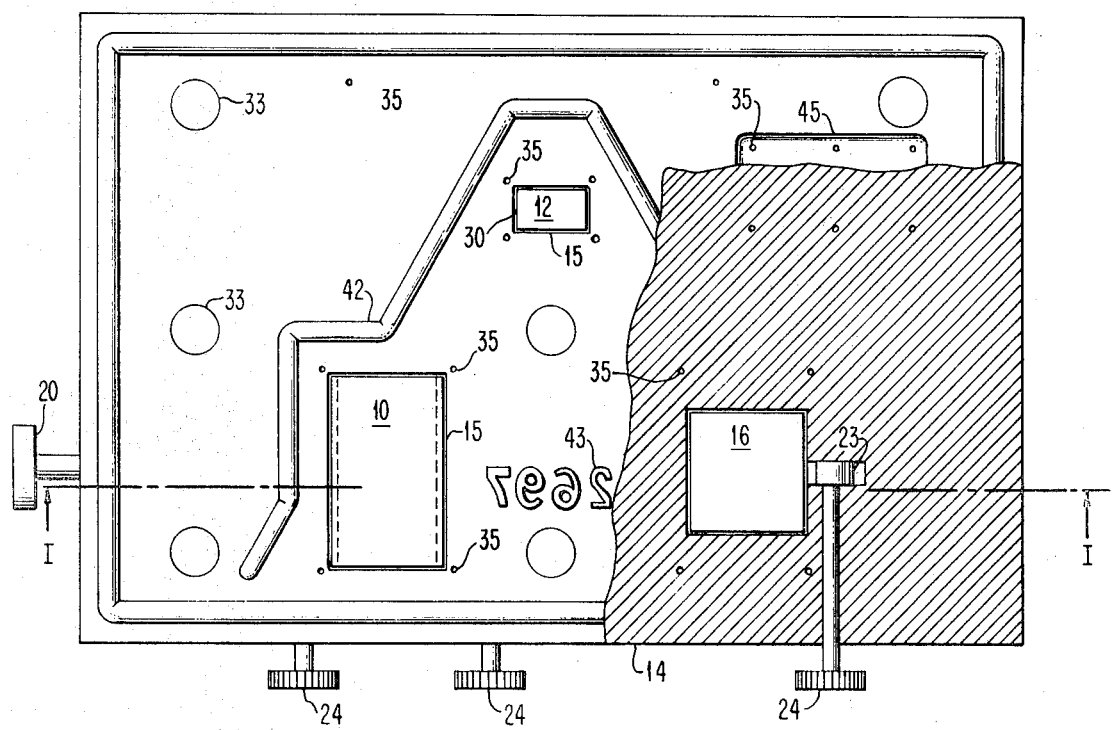
FIG. 2 is a plan view of the equipment shown in FIG. 1 taken along lines II—II thereof, and partially broken away to show a feature of internal construction.

The apparatus shown generally in FIGS. 1 and 2 can be employed for assembling a plurality of intercooperating machine components 10, 11, and 12, shown herein as typical bearing castings with sheet metal 13 in accordance with my process. The apparatus principally includes a jig or fixture 14 having a plurality of cavities 15 for receiving the machine components 10, 11, and 12. The cavities 15 support components 10, 11 and 12 in approximately their desired spacial inter-relationship. Blocks or platforms 16 are resiliently suspended by spring 17 for vertical movement within the jig 14 and supportingly receive an end portion of respective machine components 10, 11 and 12.

The jig 14 is further provided with tapered shot pins 20 for precise positioning of the components 10 and 11, for example, by coaxial engagement with bearing guide surfaces, openings or bores 21 and 22 therein. Clamping eccentrics 23, operated by manual knobs 24, secure the platforms 16 in place prior to application of any external load on the components 10, 11 and 12 to prevent deformation of the precision shot pins 20.

As supported by the jig 14, each component 10, 11 and 12 has a base portion 30 that is exposed upwardly in projection to a common plane or surface 31. Preferably, the component base portion 30 is undercut or otherwise suitably configured to form a secure mechanical interlocking connection with the sheet metal structural support member to be formed. A fluid conduit 32 communicates with the space surrounding the bases 30 of the components 10, 11 and 12 by which vacuum or pressure can be applied to the sheet 13. A plurality of knockout or ejection pins 33 are recessed in the surface of jig 14 and are selectively raised in unison by any available pneumatic or hydraulic power source 34. Suitable venting ports 35 are provided for exhausting trapped air from various critical surface points on the jig such as the corners of the components 10 and 11.

Figure 6:
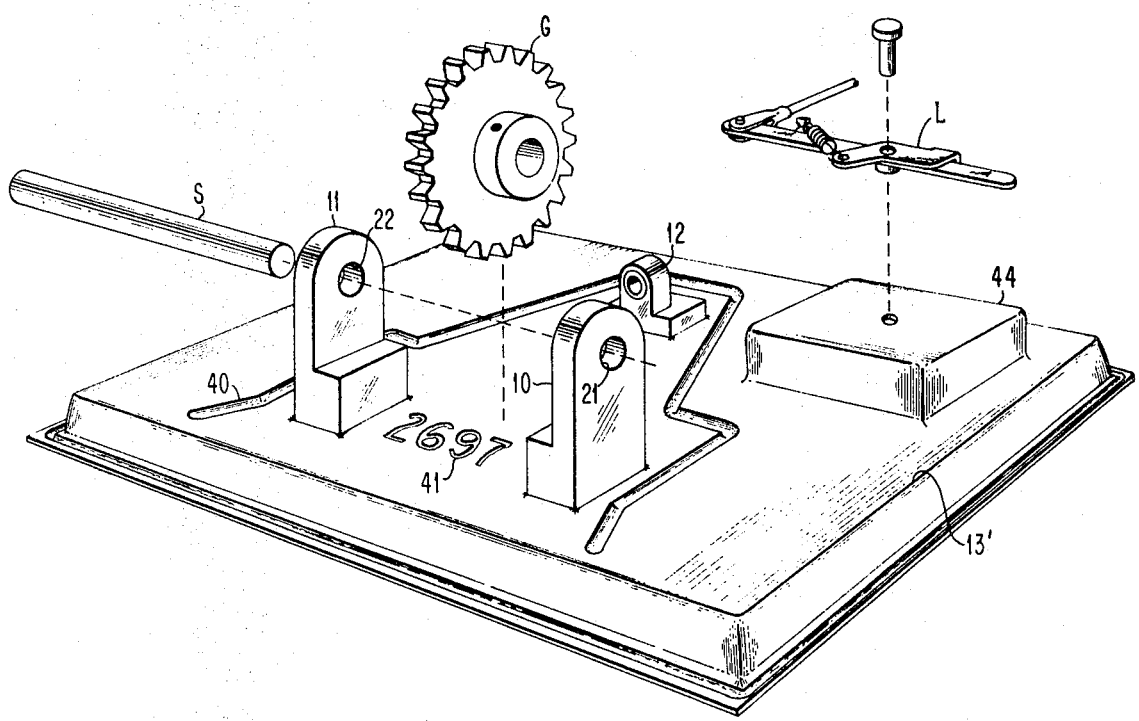
FIG. 6 is an exploded perspective view of the assembly manufactured in the equipment shown in FIGS. 1 through 5 illustrating assembly of typical components of a small machine or appliance.

The jig 14 may be additionally provided with a suitable surface configuration for shaping the structural support member during assembly. For example, reinforcing ribs 40 and information or decoration 41, such as trademarks or serial numbers as shown in FIG. 6 are formed respectively by a bead 42 and projecting characters 43 on the jig surface (see FIGS. 1 and 2). If desired, mounting lands or platforms such as 44 (FIG. 6) can be integrally formed by the provision of a suitably configured depression such as 45 (see FIG. 2).

The apparatus further includes a top plate or cover 50 mounted for reciprocal movement by screw jack 51. The cover 50 includes a seal forming periphery 52 that cooperates tongue-in-groove with corresponding seal forming structure 53 on the jig 14 to entrap a closed boundary of the sheet metal 13 thereupon. The cover 50 is provided with electrical resistance heat source 54 that is controlled to maintain a proper forming temperature determined principally by considerations of the specific sheet metal employed together with the time and pressure available for forming. Heat from source 54 is conducted to sheet 13 through transfer surface 55. A fluid conduit 56 is provided for developing a pneumatic pressure differential across the sheet 13 during the forming process.

The principal mechanical steps of my process are illustrated sequentially in FIGS. 1, 3, 4, 5 and 6. Prior to mechanical processing, a sheet of an appropriate metal is selected and preconditioned as described in aforesaid U.S. Pat. 3,340,101, to exhibit a strain rate sensitivity preferably of at least 0.3. For example, sheet of 78% Zn, 22% Al by weight, should be preconditioned by holding at a temperature of about 600 degrees F. for one hour, then quenching in water with agitation to produce a metastable phase state. Just prior to forming, the sheet is reheated to within the range of 500 to 532 degrees F. at which temperature the sheet exhibits a strain rate sensitivity of at least 0.4 which is appropriate for forming. If forming time or load is significant to a particular assembly operation, these factors can be reduced by an additional intermediate treatment of the sheet as described in U.S. Pat. No. 3,420,717, entitled "Metal Softening Process and Product Thereof."

Figure 3:
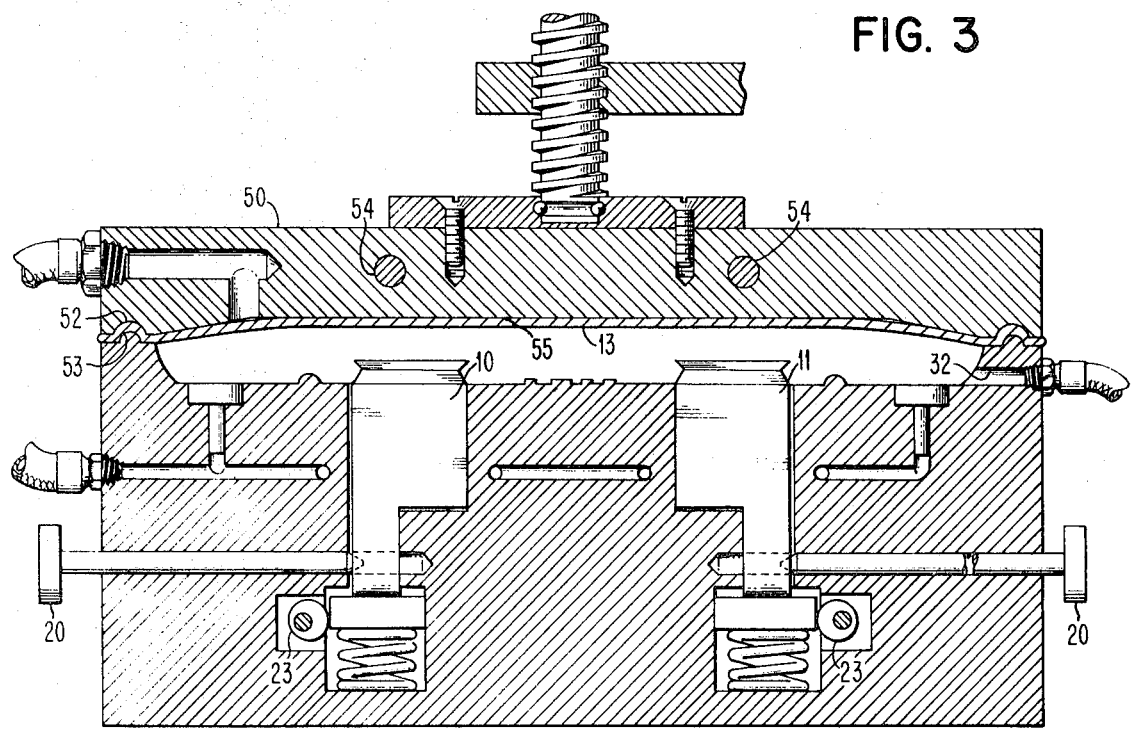
FIG. 3 is a front elevational view of the equipment shown in FIG. 1 at an intermediate stage in the performance of my process.
Figure 4:
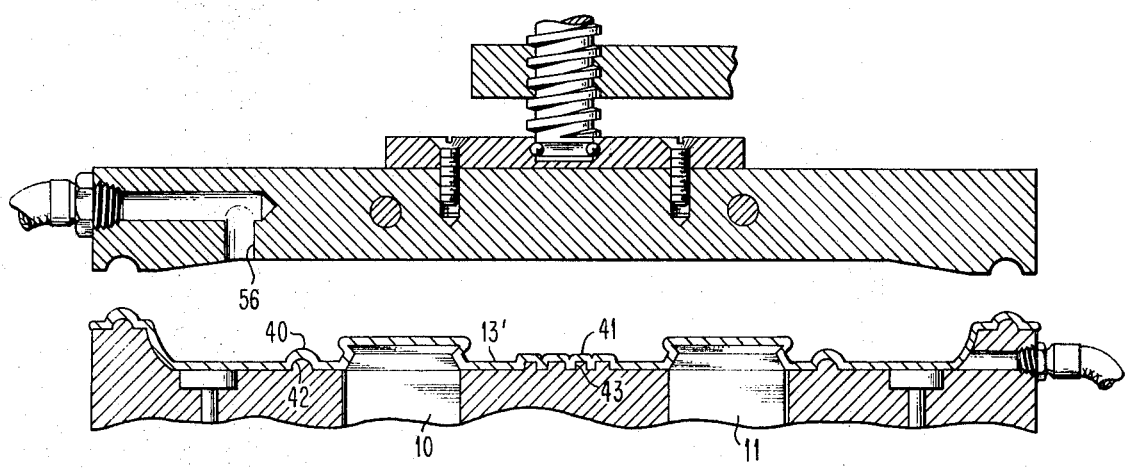
FIG. 4 is a front elevational view of the equipment shown in FIGS. 1 and 3 after the forming stage of my process has been completed.

As shown in FIG. 1, a preconditioned sheet of metal 13 is placed on jig 14 in operative projection to the exposed bases 30 of components 10, 11 and 12. I prefer to complete the preconditioning of this sheet by bringing it to forming temperature by heating means 54 after it is in place on the jig 14. This in-place heating can be accomplished by bending the cool sheet 13 into contact with heat transfer surface 55 as shown in FIG. 3 by application of pneumatic pressure from conduit 32. Sheet 13 thus is deflected slightly upwardly into close proximity with the top cover 50 to provide efficient heat transfer from the heating elements 54.

When the temperature of sheet 13 is within its forming range, preferably 520 to 532 degrees F. for the zinc-aluminum eutectoid described, a downward pressure differential is developed as by pneumatic fluid supplied from conduit 56 to stretch and deform sheet 13 around the base portions 30 and the jig surface configurations 42, 43 and 45. The components 10, 11 and 12 thus are securely entrapped by the sheet as formed into a structural support member 13' shown in FIGS. 4, 5, and 6. A pressure differential of 100 p.s.i. has formed a conditioned zinc-aluminum sheet in approximately 30 seconds, as an example of the order of magnitude of actual pressure and time required.

Figure 5:
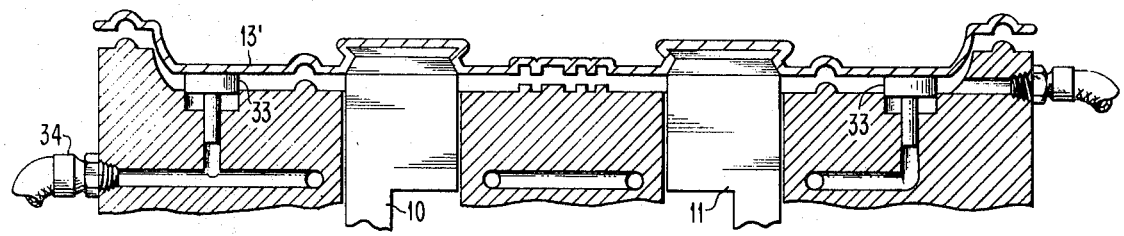
FIG. 5 is a partial front elevational view of the equipment shown in FIGS. 1, 3 and 4 illustrating the ejection of a formed assembly therefrom.

After forming, the formed member 13' is made rigid by cooling or, in the case of the zinc-aluminum eutectoid described, by overheating just over 532 degrees F. prior to removal from the jig 14. When the support member 13' has become sufficiently rigid, pressure is supplied from source 34 to ejection pins 33, as shown in FIG. 5, to lift the entire assembly from the jig 14 without distortion thereof.

FIG. 6 shows the support member 13' thus formed having the components 10, 11 and 12 securely mounted thereon. The machine is now ready for further assembly as by insertion of a further component such as shaft S into the concentric bearing guide surfaces 21 and 22 provided by components 10 and 11, together with the assembly of other machine elements such as gear G and linkage L.

Those skilled in the art will recognize that I have provided a unique and particularly precise method of assembling structural components of small machines to an integral base. My method takes particular advantage of the ability of superplastic sheet metal to form under pneumatic loading into close engagement with a die surface and also takes advantage of the precision of location of components provided by the basically static jig construction which is obtainable at a much lesser price than precision obtained in machine tools having moving load bearing components. It will be recognized that the specific example set forth above is for purposes of illustration only and that modifications, additions and deletions can be made thereto without departing from the inventive concepts of my invention as set forth in the appended claims.

I claim:

1. Procedure for securely assembling a plurality of intercooperating components of a machine with a unitary structural support comprising the steps of:

supporting said components in their desired orientation and spatial relationship while exposing a base portion of each of said components, positioning a sheet of metal conditioned to exhibit an effective strain rate sensitivity adjacent said component base portions, applying a fluid pressure loading across said sheet to deform said sheet into embracing structural engagement with said base portions, and assembling a further component into cooperating relationship with at least two of said plurality of components for relative movement thereon.

2. The procedure defined in claim 1 wherein said metal is conditioned to exhibit a strain rate sensitivity of at least 0.3.

3. The procedure defined in claim 1 wherein the base portion of each of said components is exposed to a common plane of projection and said deforming step moves said sheet through said common plane of projection onto said exposed base portion.

4. The procedure defined in claim 1 wherein said sheet metal is conditioned to exhibit an effective strain rate sensitivity by the preliminary steps of:

providing blank metal conditionable to exhibit effective strain rate sensitivity at elevated temperature, and heating said blank metal to an elevated temperature wherein it exhibits its effective strain rate sensitivity.

5. The procedure defined in claim 1 wherein said positioning step comprises the steps of:

providing blank sheet metal conditionable to exhibit effective strain rate sensitivity at elevated temperature, providing a cover member including a heat source and a heat transfer surface, positioning said blank sheet of conditionable metal adjacent said components, positioning said cover adjacent said positioned sheet, deflecting said sheet into conductive heat transfer contact with said heat transfer surface, and transferring heat from said source through said transferring surface to said sheet of conditionable metal to an elevated temperature wherein said metal exhibits its effective strain rate sensitivity.

6. The procedure as defined in claim 1 comprising the additional step of deforming said sheet separately from said embracing structural engagement deformation to provide a final structural support having a predetermined configuration.

7. Procedure for constructing a machine having a plurality of intercooperating components comprising at least two components having cooperable guide surfaces thereon, and comprising the steps of:

supporting said components in their desired orientation and spatial relationship while exposing a base portion of each of said components, positioning a sheet of metal conditioned to exhibit an effective strain rate sensitivity adjacent said component base portions, deforming said sheet into embracing structural engagement with said base portions, and assembling a further component with said guide surfaces of said two components for cooperative relative movement thereon.

8. The procedure defined in claim 7 wherein said guide surfaces comprise bearing openings defining a common rotational axis and said further component comprises a rotatable shaft that is assembled in said bearing openings for rotation upon said common axis.

9. Procedure for securely assembling a plurality of intercooperating components of a machine with a unitary structural support wherein at least two of said components have cooperable guide surfaces thereon, said procedure comprising the steps of:

supporting said components in their desired orientation and spatial relationship while exposing a base portion of each of said components, providing blank metal of a composition of by weight, approximately 78% zinc and 22% aluminum and formed to provide two opposed principal surfaces, holding said blank metal at a temperature in excess of 600 degrees F. for at least one hour, quenching said blank metal to a metastable state, positioning said blank metal with its opposed principal surfaces in operative projection to the exposed base portions of each of said components, deforming said sheet into embracing structural engagement with said base portion, and assembling a further component with said guide surfaces of said two components for cooperative relative movement thereon.

10. The procedure defined in claim 9 wherein said guide surfaces comprise bearing openings defining a common rotational axis and said further component comprises a rotatable shaft that is assembled in said bearing openings for rotation upon said common axis.

References Cited
UNITED STATES PATENTS

| | | | |
|---|---|---|---|
| 3,121,944 | 2/1964 | Karau | 29—509 X |
| 3,200,551 | 8/1965 | Jakeway | 29—509 X |
| 3,339,270 | 9/1967 | Walton et al. | 29—511 |
| 3,340,101 | 9/1967 | Fields et al. | 148—11.5 |
| 3,345,736 | 10/1967 | Jakeway | 29—509 |
| 3,354,535 | 11/1967 | Winnai et al. | 29—505 X |

CHARLIE T. MOON, Primary Examiner

U.S. Cl. X.R.

29—434, 468, 509, 515; 74—606